(No Model.)
F. G. & W. F. NIEDRINGHAUS.
ATTACHING HANDLES TO VESSELS OF ENAMELED IRONWARE.
No. 286,627. Patented Oct. 16, 1883.
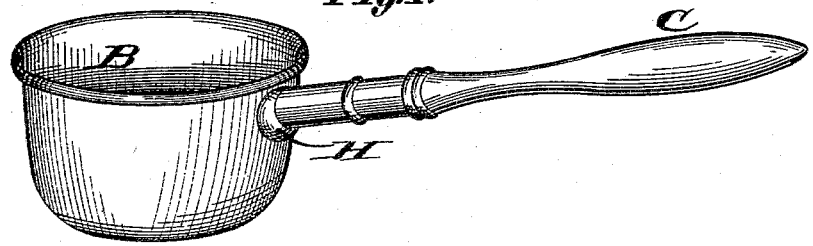
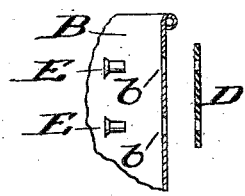 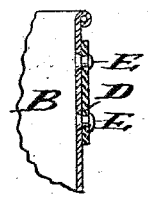 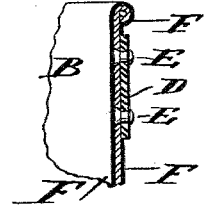
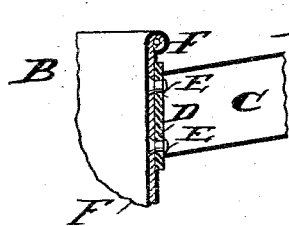 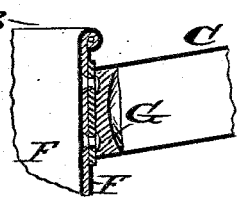 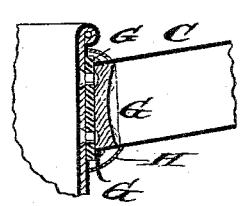
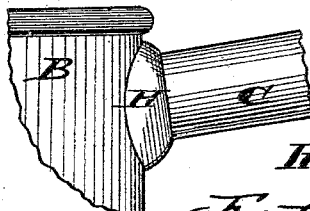
Attest:
Charles Pickles
Frank B. Johnson
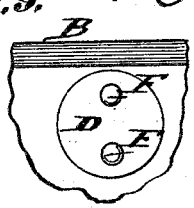
Inventors:
Frederick G. Niedringhaus
William F. Niedringhaus
by C. D. Moody
atty

United States Patent Office.

FREDERICK G. NIEDRINGHAUS AND WILLIAM F. NIEDRINGHAUS, OF ST. LOUIS, MISSOURI.

ATTACHING HANDLES TO VESSELS OF ENAMELED IRONWARE.

SPECIFICATION forming part of Letters Patent No. 286,627, dated October 16, 1883.

Application filed June 9, 1883. (No model.)

*To all whom it may concern:*

Be it known that we, FREDERICK G. NIEDRINGHAUS and WILLIAM F. NIEDRINGHAUS, residents of St. Louis, Missouri, have jointly made a new and useful Improvement in Attaching Handles to Vessels of Enameled Ironware, of which the following is a full, clear, and exact description, reference being had to the annexed drawings, making part of this specification, in which—

Figure 1 is a view in perspective of a vessel in which the improvement is embodied; Fig. 2, a section of that part of the shell or wall of the vessel to which the handle is attached; the plate or ear upon the outer side of the vessel, shell, or wall is also shown, as well as the rivets for attaching the plate, but detached from the shell or wall; Fig. 3, a view similar to that of Fig. 2, but showing the parts united; Fig. 4, a view showing the parts of Fig. 3 coated with enamel; Fig. 5, a view showing the parts of Fig. 4 and the handle abutting against the plate; Fig. 6, a view showing the parts of Fig. 5, the handle being soldered internally to the plate; Fig. 7, a sectional view, showing the handle soldered both internally and externally to the plate, and a finishing-collar attached; Fig. 8, a side elevation of the parts of Fig. 7; and Fig. 9, an elevation showing the plate riveted to the vessel, shell, or wall.

The same letters of reference denote the same parts.

The aim of this improvement is to provide an improved means for neatly and durably attaching the handle to a vessel of enameled iron-ware.

A, Fig. 1, represents a vessel such as the improvement is applicable to. B represents the shell of the vessel, and C the handle. The shell is of a material—such as sheet-iron—to which enamel adheres. A plate, D, of a material—such as brass—to which enamel does not readily adhere, but to which solder does adhere, is, by means of rivets E E, secured to the shell B, which, at *b b*, is perforated to admit the rivets. The shell B, having the plate D thus attached, and, as shown in Fig. 3, is then enameled, as shown in Fig. 4. The enamel E, however, does not, as stated, become attached to the plate D. The handle C, which is preferably tubular, as shown, is then placed endwise against the plate D, as shown in Fig. 5; and, by means of solder G, fastened thereto. The handle, at the end where it is united with the plate D, is of a material to which solder adheres. The solder may be used exclusively within the handle, as shown in Fig. 6, or it may be used upon the outside as well as within the handle, as shown in Fig. 7; or it may be used only upon the outside of the handle. In all cases it should be made to unite the handle and plate. To give a finish to the construction the collar H may be used to cover the joint, as shown in Figs. 7 and 8.

We claim—

1. The enameled shell B, the unenameled flat plate D, the abutting handle C, and the solder G, combined, substantially as described.

2. The enameled shell B, the unenameled flat plate D, the handle C, abutting against the plate, the solder G, and the collar H, substantially as described.

F. G. NIEDRINGHAUS.
WM. F. NIEDRINGHAUS.

Witnesses:
C. D. MOODY,
J. W. HOKE.